United States Patent
Cao et al.

(10) Patent No.: US 11,003,666 B2
(45) Date of Patent: May 11, 2021

(54) FILTER OPTIMIZER FOR DATA STREAMS

(71) Applicant: International Business Machines Corporation, Armonk, NY (US)

(72) Inventors: Bin Cao, Stanford, CA (US); Jessica R. Eidem, Rochester, MN (US); Brian R. Muras, Otsego, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/038,933

(22) Filed: Jul. 18, 2018

(65) Prior Publication Data

US 2018/0329959 A1    Nov. 15, 2018

Related U.S. Application Data

(63) Continuation of application No. 14/869,476, filed on Sep. 29, 2015, now Pat. No. 10,061,811, which is a
(Continued)

(51) Int. Cl.
*G06F 16/2455* (2019.01)
*G06F 16/9535* (2019.01)
(Continued)

(52) U.S. Cl.
CPC .... *G06F 16/24568* (2019.01); *G06F 11/3034* (2013.01); *G06F 11/3041* (2013.01);
(Continued)

(58) Field of Classification Search
CPC .... G06F 16/26; G06F 16/282; G06F 16/2453; G06F 16/24542; G06F 16/2471
(Continued)

(56) References Cited

U.S. PATENT DOCUMENTS 7,971,054 B1  6/2011  Boisjolie
8,086,593 B2  12/2011  Surna
(Continued)

FOREIGN PATENT DOCUMENTS

JP    2009049905 A    3/2009

OTHER PUBLICATIONS

Abadi et al., "Aurora: a new model and architecture for data stream management," The VLDB Journal (2003) 12, pp. 120-139.
(Continued)

*Primary Examiner* — Dangelino N Gortayo
(74) *Attorney, Agent, or Firm* — Jay Wahlquist

(57) ABSTRACT

Embodiments of the preset disclosure include a method, a system, and a computer program product for rearranging a set of filters within a data streams environment. The method includes setting a first filter ordering of two or more filter processing elements. The method includes determining a filtering efficiency of the first filter ordering. The determining of the filtering efficiency includes monitoring a runtime, one or more tuples, and an amount of tuples retained after filtering of the first filter ordering. The method includes creating a second filter ordering of the two or more filter processing elements. The method includes comparing the filtering efficiency of the second filter ordering to the first filter ordering. The method includes selecting the second filter ordering in response to comparing the filtering efficiency of the second filter ordering to the filtering efficiency of the first filter ordering.

18 Claims, 9 Drawing Sheets

Related U.S. Application Data continuation of application No. 14/722,950, filed on May 27, 2015, now Pat. No. 10,025,824.

(51) Int. Cl.
  *G06F 16/2453* (2019.01)
  *G06F 16/26* (2019.01)
  *G06F 11/30* (2006.01)
  *G06F 11/34* (2006.01)
  *G06F 16/35* (2019.01)

(52) U.S. Cl.
  CPC .... *G06F 11/3409* (2013.01); *G06F 16/24542* (2019.01); *G06F 16/9535* (2019.01); *G06F 16/2453* (2019.01); *G06F 16/24544* (2019.01); *G06F 16/24554* (2019.01); *G06F 16/26* (2019.01); *G06F 16/35* (2019.01)

(58) Field of Classification Search
  USPC .................. 707/602, 754, 805, 684, 802
  See application file for complete search history.

(56) References Cited

U.S. PATENT DOCUMENTS

| | | | |
|---|---|---|---|
| 8,477,611 | B2 | 7/2013 | Lim |
| 8,601,147 | B2 | 12/2013 | Craft |
| 8,706,715 | B2 | 4/2014 | Eidson |
| 8,756,335 | B2 | 6/2014 | Barsness |
| 8,972,337 | B1 | 3/2015 | Gupta |
| 9,455,903 | B2 | 9/2016 | Hui |
| 9,576,007 | B1* | 2/2017 | Sivathanu ........... G06F 16/2228 |
| 9,600,550 | B2* | 3/2017 | Stevens .................. H04L 67/02 |
| 9,779,150 | B1* | 10/2017 | Sherman ................ G06F 16/26 |
| 2009/0313614 | A1 | 12/2009 | Andrade |
| 2011/0131198 | A1 | 6/2011 | Johnson |
| 2011/0219044 | A1* | 9/2011 | Peukert ................. G06F 16/367 707/805 |
| 2013/0218901 | A1 | 8/2013 | Majnemer |
| 2013/0311600 | A1 | 11/2013 | McDiarmid |
| 2014/0236920 | A1 | 8/2014 | Branson |
| 2014/0237134 | A1 | 8/2014 | Branson |
| 2014/0280895 | A1 | 9/2014 | Branson |
| 2014/0289183 | A1* | 9/2014 | Dipper .................. G06F 16/283 707/602 |
| 2014/0297665 | A1* | 10/2014 | Stevens .................. H04L 67/20 707/754 |
| 2015/0142773 | A1 | 5/2015 | Mindnich |
| 2015/0220570 | A1 | 8/2015 | Attaluri |
| 2015/0248476 | A1 | 9/2015 | Weissinger |
| 2016/0350381 | A1 | 12/2016 | Cao |
| 2016/0350427 | A1 | 12/2016 | Cao |
| 2017/0316055 | A1* | 11/2017 | Chen .................. G06F 16/2453 |
| 2020/0200912 | A1* | 6/2020 | Chen .................. G06K 9/00791 |

OTHER PUBLICATIONS

Anonymous, "Dynamic Control over Operator Interconnection and Data Routing in Stream Computing Applications," IP.com Prior Art Database Technical Disclosure, IP.com No. 000238360, Aug. 20, 2014, 7 pages.

Babu et al., "Adaptive Ordering of Pipelined Stream Filters," SIGMOD '04: Proceedings of the 2004 ACM SIGMOD international conference on Management of data, Jun. 13-18, 2004, 13 pages.

List of IBM Patents or Patent Applications Treated as Related. Filed Herewith. 2 pages.

\* cited by examiner

| Filter Order | First Time Period | Second Time Period | Third Time Period | Tuples Kept After Filtering | Total Time Used by Filtering |
|---|---|---|---|---|---|
| F1->F2->F3 | 1000 @ F1 =10000 Sec | 900 @ F2 =9000 Sec | 270 @ F3 =270 Sec | 135 | 10000+9000+270= 19270 Sec |
| F1->F3->F2 | 1000 @ F1 =10000 Sec | 900 @ F3 =900 Sec | 450 @ F2 =4500 Sec | 135 | 10000+900+4500= 15400 Sec |
| F2->F1->F3 | 1000 @ F2 =10000 Sec | 300 @ F1 =3000 Sec | 270 @ F3 =270 Sec | 135 | 10000+3000+270= 13270 Sec |
| F2->F3->F1 | 1000 @ F2 =10000 Sec | 300 @ F3 =300 Sec | 150 @ F1 =1500 Sec | 135 | 10000+300+1500= 11800 Sec |
| F3->F1->F2 | 1000 @ F3 =1000 Sec | 500 @ F1 =5000 Sec | 450 @ F2 =4500 Sec | 135 | 1000+5000+4500= 10500 Sec |
| F3->F2->F1 | 1000 @ F3 =1000 Sec | 500 @ F2 =5000 Sec | 150 @ F1 =1500 Sec | 135 | 1000+5000+1500= 7500 sec |

FIG. 8

FILTER OPTIMIZER FOR DATA STREAMS

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive one or more tuples to be processed by a plurality of processing elements operating on one or more computer processors.

One embodiment of the preset disclosure includes a method for rearranging a set of filters within a data streams environment. The method includes setting a first filter ordering of two or more filter processing elements. The method includes determining a filtering efficiency of the first filter ordering. The determining of the filtering efficiency includes monitoring a runtime of the first filter ordering, one or more tuples as the one or more tuples pass through the data streams environment, and an amount of tuples retained after filtering of the first filter ordering. The method includes creating a second filter ordering of the two or more filter processing elements. The method includes comparing the filtering efficiency of the second filter ordering to the first filter ordering. The method includes selecting the second filter ordering in response to comparing the filtering efficiency of the second filter ordering to the filtering efficiency of the first filter ordering.

Another embodiment of the present disclosure includes a system for rearranging a set of filters within a data streams environment. The system includes a memory, and a processor device communicatively coupled to the memory. The memory and processor device are also communicatively coupled to a filter optimizer that is configured to monitor a set of two or more filters within the data stream environment. The filter optimizer of the system is configured to set a first filter ordering of the two or more processing elements. The filter optimizer of the system is configured to determine a filtering efficiency of the first filter ordering. The filtering efficiency of the first filter ordering includes monitoring a runtime of the first filter order, monitoring one or more tuples as the one or more tuples pass through the data streams environment, and monitoring an amount of tuples retained after filtering of the first filter ordering. The filter optimizer of the system is configured to create a second filter ordering of the two or more filter processing elements wherein the second filter ordering differs from the first filter ordering of the two or more filters. The filter optimizer of the system is configured to compare the filtering efficiency of the second filter ordering and the first filter ordering. The filter optimizer of the system is configured to select the second filter ordering in response to comparing the filtering efficiency of the second filter ordering.

Yet another embodiment is directed toward a computer program product for optimizing a filter ordering within a data streams environment. The computer program product is configured to monitor a set of two or more filters within the data stream environment. The computer program product is configured to set a first filter ordering of the two or more processing elements. The computing device determines a filtering efficiency of the first filter ordering. The filtering efficiency of the first filter ordering includes monitoring a runtime of the first filter order, monitoring one or more tuples as the one or more tuples pass through the data streams environment, and monitoring an amount of tuples retained after filtering of the first filter ordering. The computing device creates a second filter ordering of the two or more filter processing elements wherein the second filter ordering differs from the first filter ordering of the two or more filters. The computing device compares the filtering efficiency of the second filter ordering and the first filter ordering. The computing device selects the second filter ordering in response to comparing the filtering efficiency of the second filter ordering.

BRIEF DESCRIPTION OF THE DRAWINGS

FIG. 8 illustrates a table of determining an optimized filter ordering using filter time to determine a filter shuffle, according to various embodiments.

Figure 1:
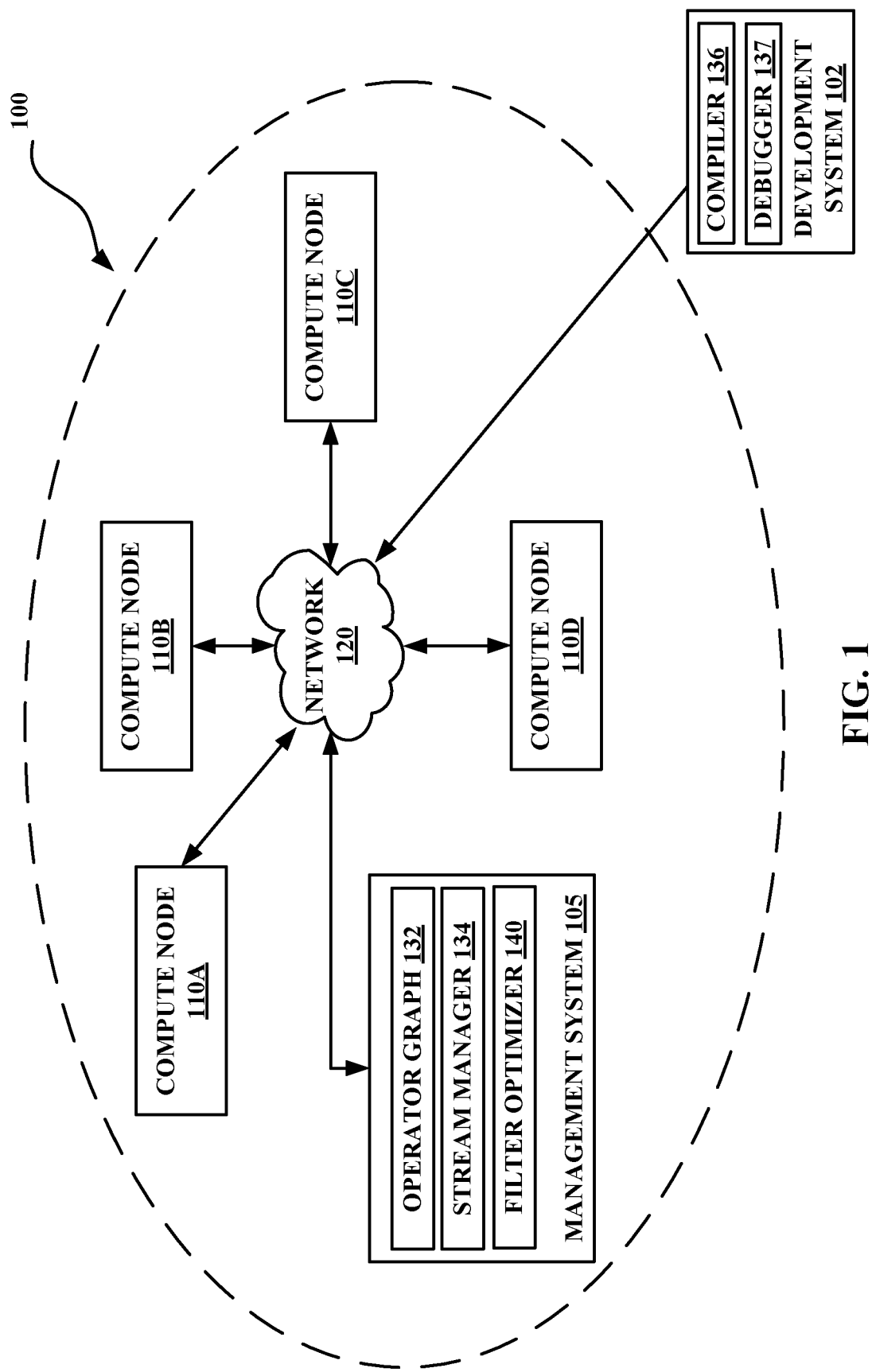
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data streams; more particular aspects relate to optimizing an ordering of filters within a data stream. The ordering of filters within the data stream may be reordered to increase the efficiency of the filtering of one or more tuples. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

"Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Specifically, as further described below, a break point path in an operator graph may be defined by two or more stream operators. For example, a first stream operator provides its output to a second stream operator. The second stream operator provides its output to a third stream operator, and so on. The first, second, third, and additional operators can define a break point path. When a particular tuple "A" is received by the first stream operator, the corresponding tuple output from the first stream operator is referred to herein as the same tuple A. And after the tuple A is output from the first stream operator and received by the second stream operator, the corresponding tuple output by the second stream operator is referred to herein as the same tuple A. More generally, a tuple input to a stream operator at the head of the break point path may be referred to as the same tuple at the input and output of each subsequent stream operator in the path.

The data streams environment, there are frequently many filter operators which discard tuples based on various application criteria. From a system performance perspective, the earlier in the stream application that a tuple can be filtered from the stream, the better. Thus, minimal compute resources are spent working on the tuple that is later discarded. To save compute resources, when considering multiple filter criteria, streams may want to start with the more selective filter criteria, and discard tuples with minimal amount of resources used. The filters are often arbitrarily ordered by developers at development time or based on some business logic, or written by different developers, etc. Even when ordered with a good initial ordering, the optimal ordering may change over time, or with different streams input. To prevent a filter ordering from being inefficient, the filters can be reordered or shuffled to better suit the needs of the stream.

The filter ordering may include an initial arbitrary ordering of two or more filter processing elements or filters within the streaming environment. The ordering of the filters may include one or more filter orderings that can be created from the two or more filter processing elements. The two or more filter processing elements may be reordered or shuffled from a first filter ordering to a second filter ordering. When shuffled the first filter ordering may be stored. The ordering of the filters may be to be reverted to the first filter ordering on the determination of the first filter ordering being more efficient than the second filter ordering the filters were shuffled to. For example, two filters may be ordered in a first filter ordering F1→F2. The first filter ordering may then be shuffled to create a second filter ordering F2→F1. If the first filter ordering is more efficient than the second filter ordering, then the ordering of the filters can be reverted to the first filter ordering. Filter ordering will be described further herein.

A Filter Optimizer (FO) can be introduced to consider the time spent in computing for various filters. A historical selectivity of a filter can be used as input to reorder the filters into an optimal configuration for future candidate answers. The FO can constantly monitor the candidate answers for performance and selectivity, and use the information to rearrange the order of the filters. The rearrangement of the filters can be based on a criteria set by an administrator of the streaming environment. The criteria, for example, can include one rearrange per time period, per a certain amount of tuples, or rearrange if the benefit is estimated to be better than the threshold.

In various embodiments, the FO can test rearrangements to determine if the rearranged order of the filters increases a filter efficiency of the streams environment. The filter efficiency for example can include reducing the time spent on the filtering process. An example of reducing time spent could include a filter arrangement that reduces the amount of time that it would take another arrangement to do the filtering process. In an example, two filter arrangements of the same filters can include a filter arrangement A and a filter arrangement B. The filter arrangement A could take 10000 seconds to process 1000 tuples, whereas the filter arrangement B could take 5000 seconds to process the same 1000 tuples. The filter arrangement B would be the optimal choice of filter arrangements to reduce the amount of filter time to process the 1000 tuples.

In various embodiments, the filter arrangements can be monitored for the amount of tuples retained after filtering. In an example, two filter arrangements of the same filters can include a filter arrangement A and a filter arrangement B. The filter arrangement A could retain 150 tuples of a 1000 tuple set; whereas the filter arrangement B could retain 120 tuples, of the same 1000 tuple set. The filter arrangement B would be the optimal choice of filter arrangements to reduce the amount of filters retained of the 1000 tuples.

In various embodiments, the FO can sample a different ordering of the filters, and monitor for a greater performing configuration. A subsequent arrangement could incorporate the greater performing configuration to increase filtering efficiency.

In various embodiments, the filter optimizer can start by assuming an independence of the filters. If the filters are not independent of each other, learned correlations can be used to increase the filtering efficiency. Results of learned correlations can include a decrease in the time estimate to filter the tuples or an increase in selectivity of the dependent filters. For example, a first filter (F1), and a second filter (F2) have learned correlations with each other. For example, F1 and F2 can have an independent selectivity of 40% for F1, and an independent selectivity of 50% for F2. By multiplying the filters together 40%*50%=20% results in 20% of the tuples remaining via independence. If the filters are not independent of each other, an actual remaining tuples could be 3% instead of 20%, because the filters have learned correlations. To optimize the filter efficiency, F1 and F2 can be ran together to discard as many candidates as possible.

In various embodiments, the tuples may also be grouped together based on the attributes of the tuples. The grouping of tuples, for example, can be done to monitor the filters and determine any learned correlations between the filters. The grouping of tuples can also be done to learn if some filters are more selective based on the attributes of the tuples. The grouping of tuples can assist in determining the optimal filter ordering.

In various embodiments, filters may be more selective based on the tuples. For example, a filters selectivity may be based on a value(s) or attributes within the tuple. A different ordering of filters can be more efficient if the value of the tuple is better filtered out with a more efficient filter. Different styles of tuple values could become more efficient depending on the ordering of the filters.

In various embodiments, the filter reordering can happen dynamically during runtime. During runtime, an advisor may output an optimized filter ordering to a developer that issues the filter reordering. The advisor may output the optimized filter ordering through a filter optimizer For example, during runtime the filter optimizer may rearrange the filters while the filters are still processing tuples. If the filters are rearranged during runtime, the filters can manage the flow of tuples. If the filters are shuffled during runtime, then some the filtering process may change. To ensure that the filters still remove the correct tuples, rearrangement processes can be implemented. For example, a halt can be placed on incoming tuples. If a halt is placed on the tuples a queue can be started, the tuples currently being filtered can run through the remainder of the filters, the filters can be shuffled, the halt can be removed, and the tuples can continue flowing. In another example, the filters can shuffle, and the tuples can be rerouted to the beginning of the filter series to be re-filtered. The tuples rerouted to the beginning can be given priority to the other tuples, or be placed behind the current queue. For example, the beginning may include rerouting or transitioning the tuples to a location between the first filter of the filter series, and a processing element before the first filter of the filter series. After transitioning the tuples, the filters may be shuffled, and the tuple flow may be resumed.

In various embodiments, the filter reordering may need to be recompiled with the new filter ordering which was determined from a previous run. The new filter ordering may be determined by a previous run, the filters can be reordered before a subsequent run is started. For example, if the previous run determines that a filter reorder may be more optimal than the current filter order, then the filters can be shuffled to the optimal filter ordering before the next stream of tuples may be filtered.

In various embodiments, the optimized filter ordering can be output, and the order changes can be completed by a developer or administrator. For example, if the filtering order increases the efficiency of the filtering of the tuples, the administrator can reorder the filters based on the filter ordering. For example, the filter order information can be gathered by testing a second filter ordering, or by data gathered from the filters. A second filter ordering may include a rearrangement of the one or more filters within the stream environment, to create different filter ordering compared to the initial filter ordering.

The filter order information can take into account the time the tuples take to run through a transformation. The transformation can change the configuration of the tuple to be able to be processed by the filter. The transformation can alter the tuple or an attribute(s) of the tuple to be executable by the filter. An example of a transformation can include changing a percentage to a decimal number. Another example of a transformation can include changing a date format from a spelled date January 1, 2015 to a numbered format 1/1/15.

A join can be dynamically added by adding unique identifiers to tuples so they can be joined back together. The join may also be dynamically added by inverse transformations and joining on the raw tuple. Joins may be incorporated to attach transformations to filters to ensure that the configuration of the tuple may be read by the filters. Joins will be described further herein.

In various embodiments, operators may be placed between filters. The operators can be configured to send information, receive information, record information, join tuples, or split tuples. Unique identifiers can be added to or attached to the tuples to distinguish similar tuples or monitor the movement of tuples through the filters. Examples of unique identifiers can include a number or alphanumeric assigned to each tuple to identify the tuple from another.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
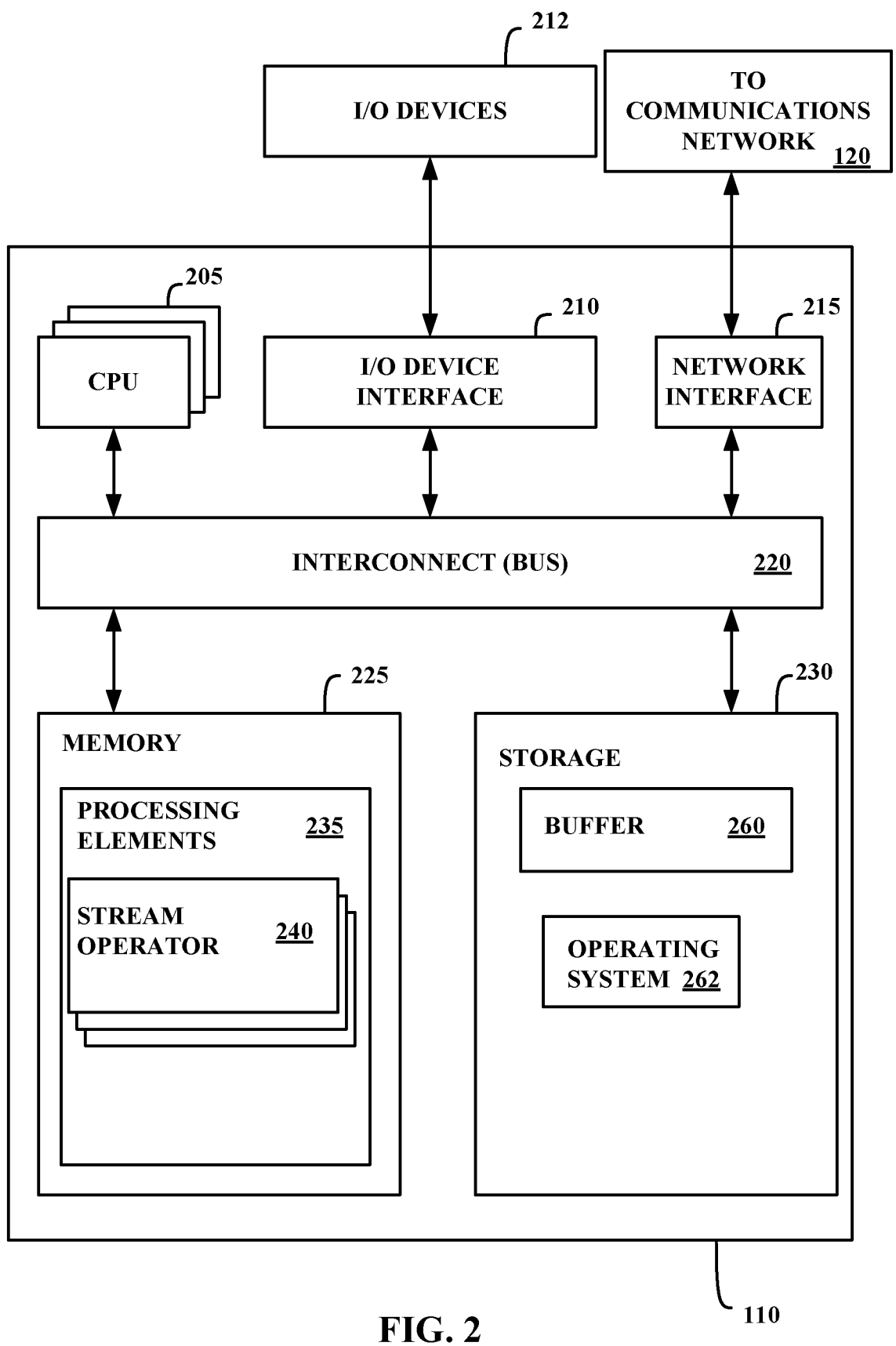
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
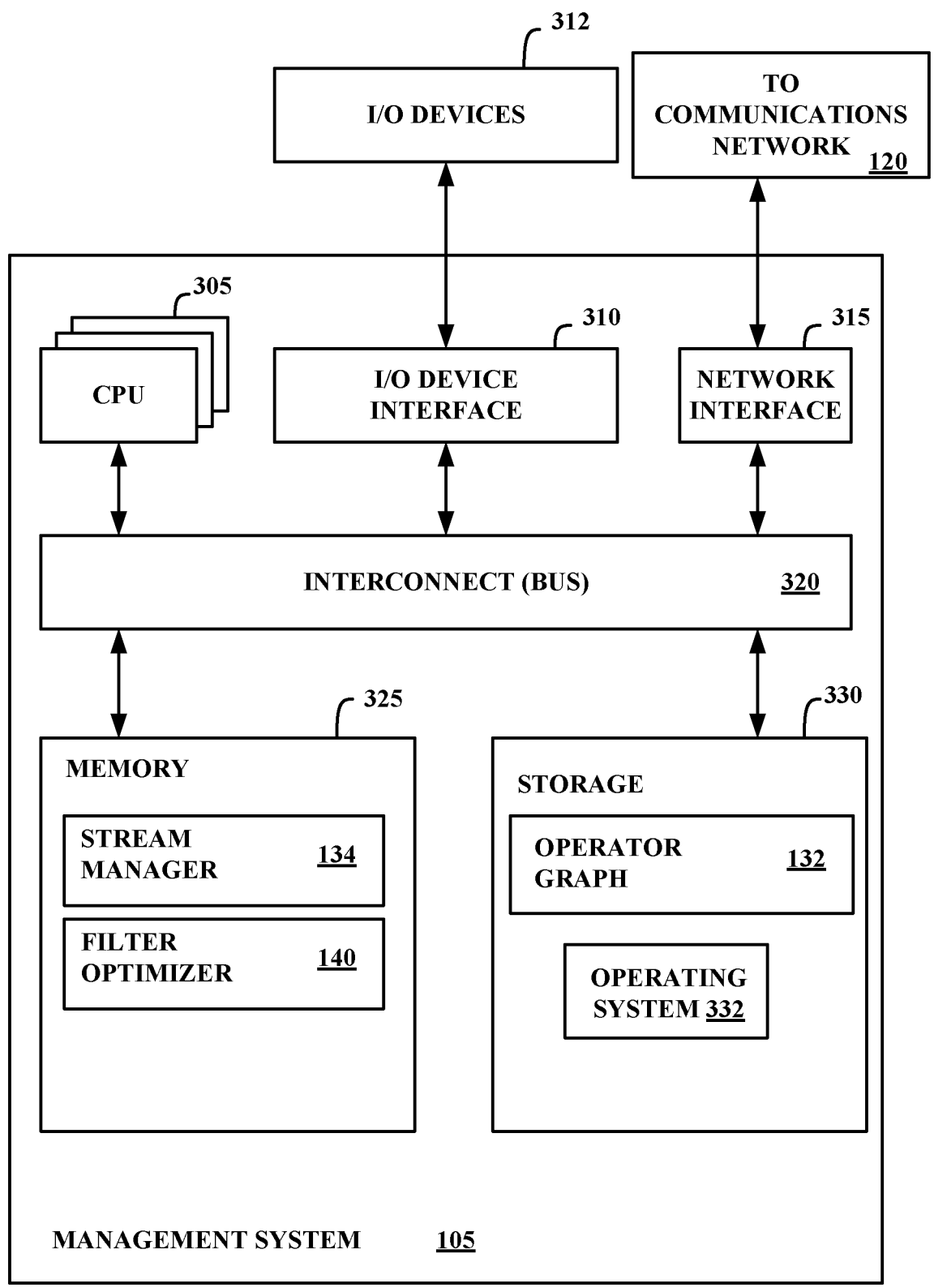
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The memory 325 may also store a filter optimizer 140. The filter optimizer 140 can determine and manage the ordering of filters using the interconnect (BUS) 320. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
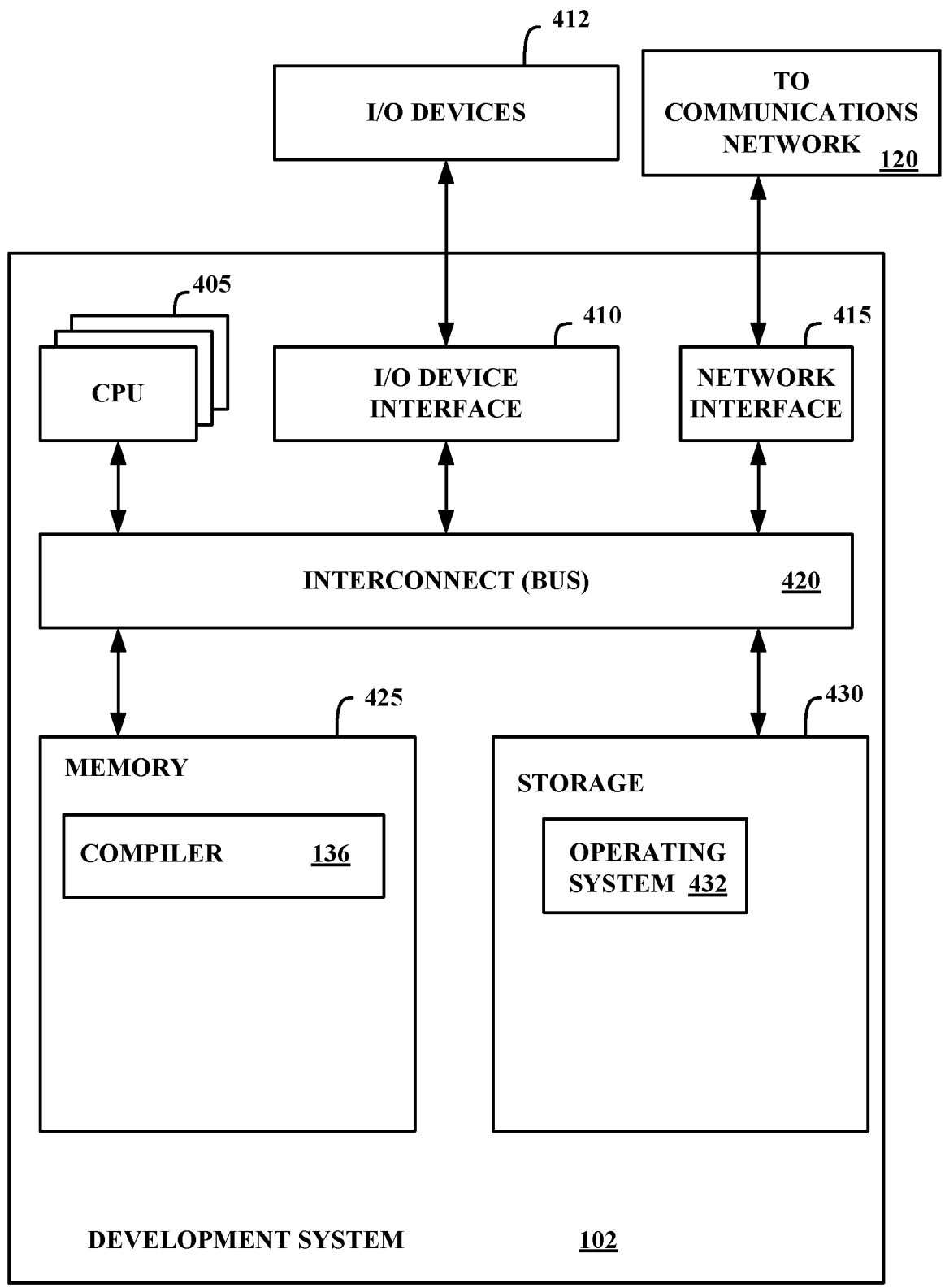
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
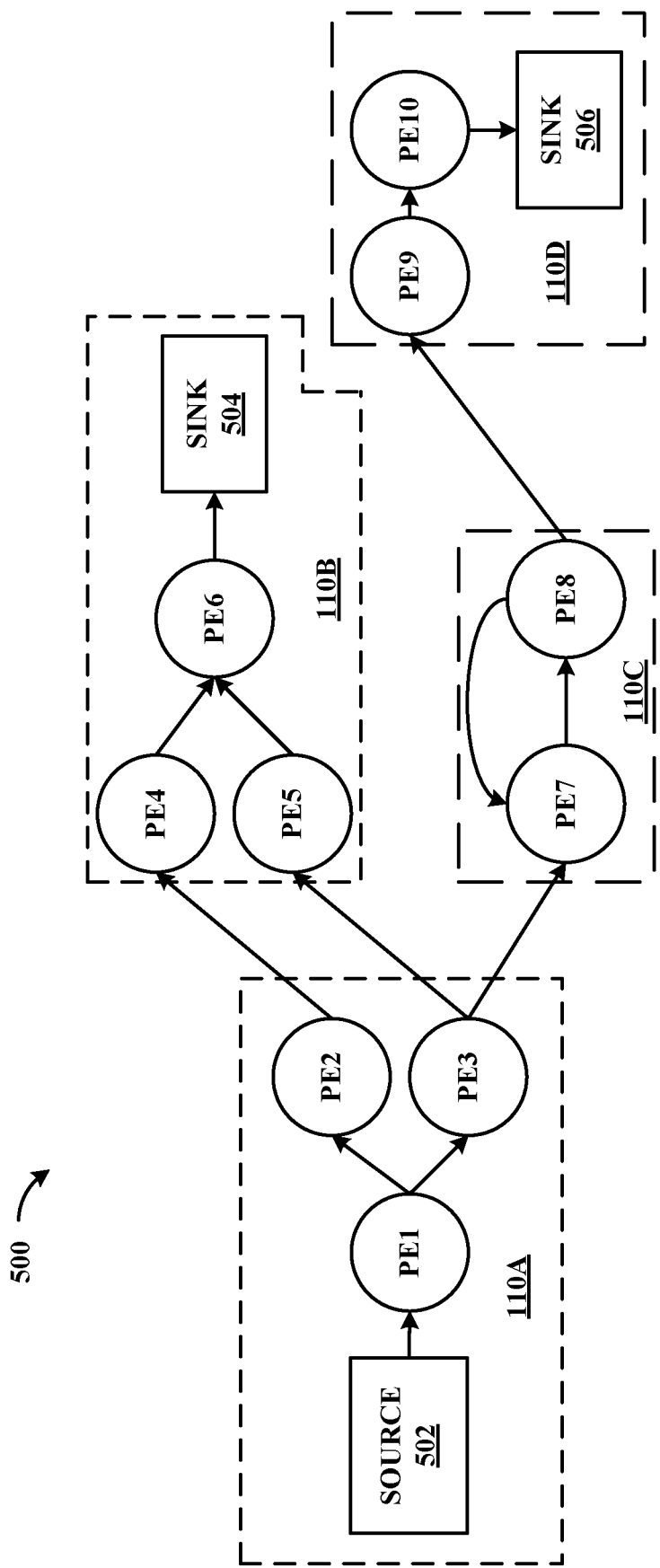
FIG. 5 illustrates an operator graph for a stream computing application, according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by the operators of PE10, which in turn outputs to a sink processing element, for example sink 506.

Processing elements 235 (FIG. 2), may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. A filter optimizer 140 may manage filters operating upon the two or more compute notes 110A-110D. The filter optimizer 140 can determine and manage the ordering of filters throughout the network 120. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6A:
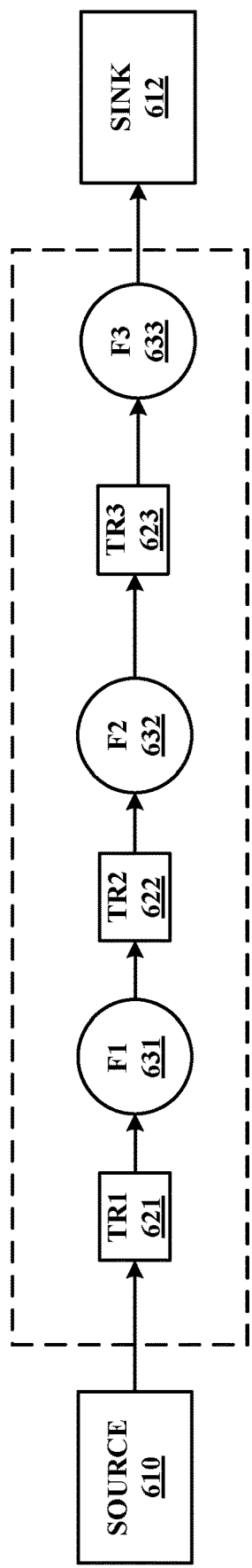
FIG. 6A illustrates a data stream environment of operators including filters before a filter shuffle, according to various embodiments.

In FIG. 6A, a data stream environment is illustrated with filters and transformations as operators prior to a filter shuffle. The ordering of the filters had not yet been shuffled to optimize the filtering efficiency of the data streaming environment. As tuples flow from the source 610 to the sink 612, the tuples may pass though one or more filters, and one or more transformations. The first filter (F1) 631 is paired with the first transformation (TR1) 621. The second filter (F2) 632 is paired with the second transformation (TR2) 622. The third filter (F3) 633 is paired with the third transformation (TR3) 623.

In an example of filtering, the tuples can pass from the source 610 to the sink 612. A tuple can leave the source 610 and can enter through TR1 621 and the tuple is transformed for F1 631 and may be filtered out of the stream or passed through. If the tuple was not filtered out by F1 631, the tuple can enter TR2 622 and is transformed for F2 632 and is may be filtered out of the stream or passed through. If the tuple was not filtered out by F1 631 or F2 632, the tuple can enter TR3 323 and is transformed for F3 633 and is may be filtered out or passed to the sink 612. Each transformation and filter can have a processing time, where the tuple is analyzed and either filtered out of the stream or passed through to the next operator. The current ordering of the filters may have not been optimized for filter efficiency; therefore, the filters can be analyzed to determine an optimized filter order for the tuple stream.

Figure 6B:
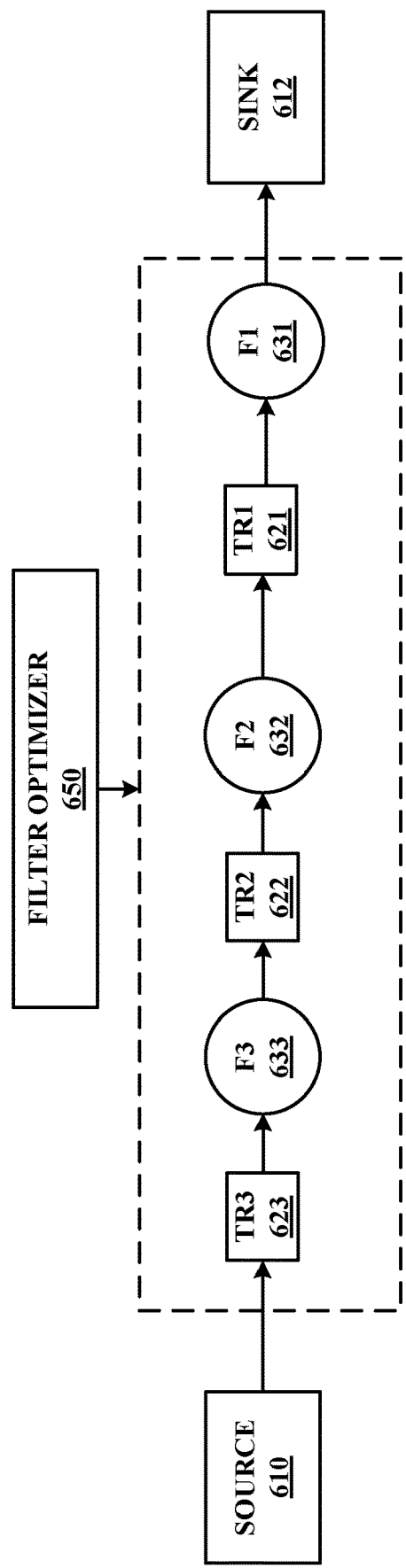
FIG. 6B illustrates a data stream environment of operators including filters after a filter shuffle, according to various embodiments.

In FIG. 6B a data stream environment of operators including filters is illustrated after a filter shuffle. The ordering of the filters has been shuffled by a filter optimizer (FO) 650 to optimize the filtering efficiency of the data streaming environment. The transformations can be shuffled along with the filters such that the filter transformations stay paired. As tuples flow from the source 610 to the sink 612, the tuples can pass though one or more filters, and one or more transformations. The third filter (F3) 633 is paired with the third transformation (TR3) 623. The second filter (F2) 632 is paired with the second transformation (TR2) 622. The first filter (F1) 631 is paired with the first transformation (TR1) 621.

In an example of filtering using the optimized filter ordering, the tuples can pass from the source 610 to the sink 612. A tuple can leave the source 610 and can enter through TR3 623 and the tuple is transformed for F3 633 and may be filtered out of the stream or passed through. If the tuple was not filtered out by F3 633, then the tuple can enter TR2 622 and is transformed for F2 632 and may be filtered out of the stream or passed through. If the tuple was not filtered out by F3 633 or F2 632, the tuple can enter TR1 321 and is transformed for F1 631 and is may be filtered out or passed to the sink 612. Each transformation and filter can have a processing time, where the tuple is analyzed and either filtered out of the stream or passed through to the next operator. The determined filtering order can be optimized again by the FO 650 depending on the filtering action or new information gathered about the filter sequence. The FO 650 can include a table that determines the most optimized filter ordering, and is described further herein.

In various embodiments, the tuple may be a group of tuples configured to be processed by the filters in a batch. The filter optimizer can monitor the batch of tuples as they pass through the filter series. Each filter and transformation can be monitored to determine the amount of time a tuple takes to pass through a filter or transformation to determine the optimal filter configuration. The filters can also be monitored to determine a filtering efficiency of the filters. The filtering efficiency can be used to determine the amount of tuples that can remain after a group of tuples are passed through the filter.

In an example of filter optimization, suppose the F1 631, the F2 632, and the F3 633 all have static runtimes. If the F3 633 is the most efficient filter it would be placed at the front of the filter ordering to reduce the amount of time filtering. For example, the filter selectivity may be the same for each filter but F3 633 may have a runtime of 1 second compared to the F2 632 and F1 631 runtimes of 10 seconds. In another example, the runtimes may be static, but F3 633 may have an increased selectivity, reducing the numbers of tuples to pass, when compared to the selectivity of F1 631 and F2 632. The more efficient filters may be placed closer to the front of the filter ordering to optimize the filter path.

In various embodiments, examples of more efficient filters may include filters with a faster runtime or a higher tuple filtering rate. A faster runtime may include a filter that process tuples faster when compared to another filter. For example, a first filter may process one tuple every 3 seconds and a second filter process one tuple every 4 seconds. The first tuple would be considered to have a faster runtime when compared to the second filter due to the runtime. A higher tuple filtering rate may include a filter that filters or discards more tuples when compared to another filter. For example, a first filter may remove 50% of the tuples from a group of tuples, and a second filter may remove 25% of the tuples from the group of tuples. The first tuple would be considered to have a higher tuple filtering rate when compared to the second filter due to the amount of tuples removed.

Tuples can be sent into the data stream from the source 610 and the monitoring of the tuples can end or the tuples can be outputted to the sink 612. The source 610 may send a grouping of tuples to be filtered to end in the sink 612 with a result of tuples that fit a desired set of conditions. The filters can be configured to remove conditions or attributes outside the desired set of conditions. For example, the tuples may be people with attributes that can be filtered to determine rates of insurance for hospitals. Using the attributes of the people and their conditions to determine how much they may have to pay as an estimate. Example filters for an insurance estimate could include age, insurance company, physical health, future trends, possible diagnostics, and insurance coverage. The filters can remove results that are outside the information given about the person and the possibility of the person being within a category. The results that are not applicable to the person can be filtered out to determine a group of tuples, which can be arranged as a range of what the person may have to pay. The stream could include a group of tuples being processing by a batch. For example, the data stream could set the filters to determine the probability of the person being within a payment category. The payment category could include filters for the attributes based on the person's income, physical health, or insurance coverage. By filtering out the attributes, the results may inform the person if they are within the payment category.

In various embodiments, the tuples can be filtered based on an event. If a certain type of attribute will be more likely based on a current event or environment, the filters can be arranged to better filter the tuples. An example of an event can include a weather event. Examples of weather events could include a tornado or earthquake. An event may be a cause to optimize the filter ordering because of the data entering the stream may be likely to be related to the event. For example if a tornado recently was a cause of a disaster to be analyzed by an insurance company. The ordering of the filters may be optimized to sort out tornado or non-tornado related claims earlier because the probability of tornado related claims may rise due to the recent event. An example of an environment could include the location of the information. An example of a location could include a state or a country.

A determination of the optimal filtering path may be determined by the available computational power of the data stream. Depending on the computational power availability of the stream environment. Filters that require high computational power or low computational power may be taken into consideration when determining the filter ordering.

Higher computational or processing power filters may include filters that require more than a set percentage of the streams available computational power. For example, if a filter requires more than 25% of the available computational power the filter may be considered a higher processing power filter. The more tuples the higher processing power filter has to process the more restricted the streams environment may be for separate operations that are linked to the same available computational power. For example, higher processing power or high reduction filters can be used earlier in the stream if the data stream has a higher amount of computational power available. Low computational power or low reduction filters can be placed later in the stream. This filter orientation can be used to remove a large chunk of the tuples initially, thereby reducing computation time, while the low computational power or low reduction filters can narrow the search results after the large chunk of tuples have been filtered.

Lower computational power or processing power filter may include filters that require less than a set percentage of the streams available computational power. For example, if a filter requires less than 10% if the available computational power, the filter may be considered a lower processing power filter. The more tuples the lower processing power filter has to process may not affect the streams environment as much as a higher processing power filter may. For example, if the data stream has a lower availability of computational power, then the lower computational power required filters may need to be ran first. The lower computational power system can then run the higher processing power or high reduction filters, after the lower computational power requiring filters have been ran. The higher computational power filters may have fewer tuples to process after the lower computational power required filters have been run.

In various embodiments, the transformation may be imperative to the filtering process. If the filter is unable to process the attributes or information of the tuple, then the filter may be unable to determine the correct action for the filtering process. If the filter is unable to determine the correct action for the filtering process, the filter may remove a tuple that otherwise would not have been filtered, resulting in a false positive. If the filter is unable to determine the correct action for the filtering process, the filter may keep a tuple that otherwise would have been filtered resulting in a false negative. To ensure that the filter receives the tuples correctly, the transformations, when applicable can be shuffled along with to the appropriate filters.

In various embodiments, a term of a first filter ordering may be assigned to the initial ordering of the filers when compared to a current filter ordering. The first filter ordering may be stored by the filter optimizer. The storing of the first filter ordering may be accessed by the filter optimizer upon the determination of the first filter ordering being more efficient than the current filter ordering. If the first filter ordering is determined to be more efficient than the current filter ordering, then the first filter ordering may be accessed and applied to the ordering of the filters. For example, a second filter ordering, which is the current filter ordering, is determined to be less efficient when compared to the first filter ordering that was stored by a filter optimizer. The filter optimizer may access the first filter ordering that is stored on the filter optimizer. The first filter ordering may then be applied to the filters to revert the ordering of the filters back to the first filter ordering.

Figure 7:
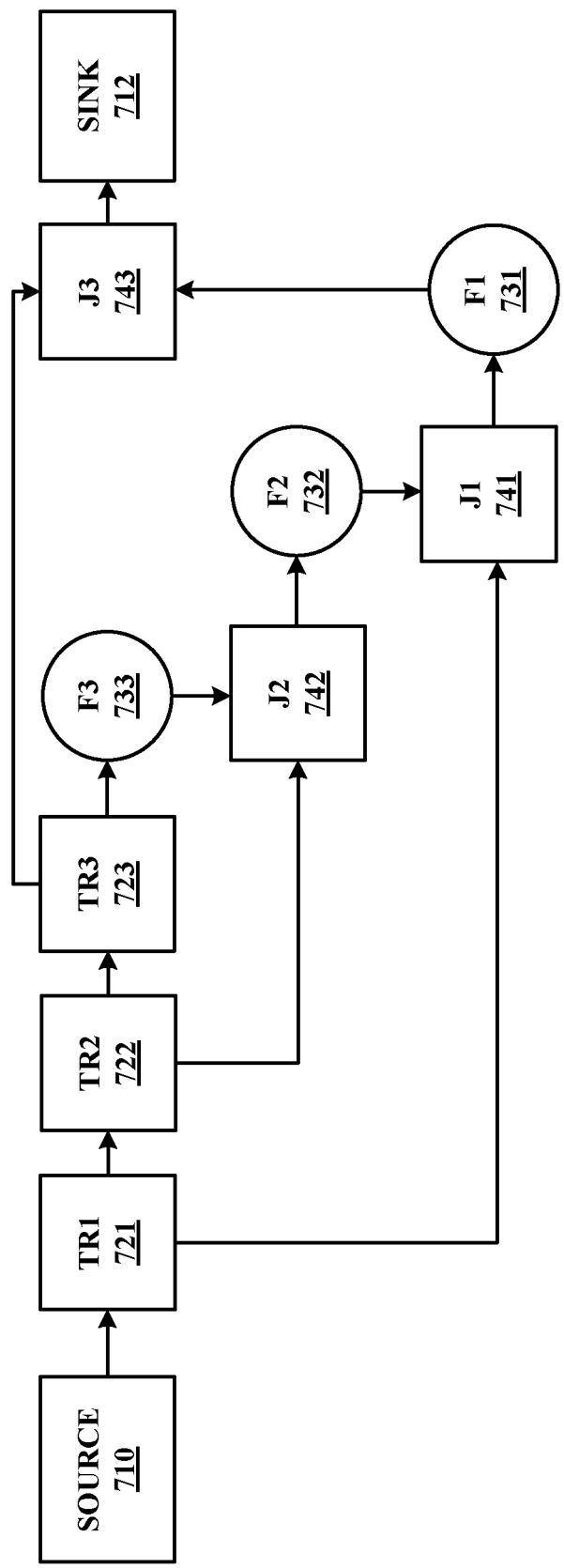
FIG. 7 illustrates joining filters to transformations after a filter shuffle, according to various embodiments.

In FIG. 7, a filter can be joined to a transformation after a filter shuffle, to ensure the filter receives the tuple in the correct configuration. Transformations can be an important factor in the data stream. The transformations may change the tuple or the flow of the tuples prior to being received by the filter. Joins can be used take the information of the transformation operator(s) to transform the tuples through the join before being filtered. The speed at which transformations are processed can be dependent on the data stream and the tuples being filtered. When the filters are orientated, transformations can be joined to the filters to ensure the configuration of the tuple may be read by the filter. The orientation can include an ordering of the filters based on the efficiency of the filters. The filters can then determine if the tuple is to be filtered out of the data stream or if the tuple will be allowed to pass into the next operator.

Joins can be added to ensure that the tuple is readable by the filter. The join can attach a transformation to the applicable filter. For example, a first filter (F1) 731 can be joined with a join (J1) 741 to a first transformation (TR1) 721. A second filter (F2) 732 can be joined with a second join (J2) 742 to a second transformation (TR2) 722. A third filter (F3) 733 with a third transformation (TR3) 723 can be joined with a third join (J3) 743 to transform the tuples to the third transformation before entering the sink 712. The tuples can flow from the source 710 to the sink 712, and tuples can be filtered out while moving through the F1 731, the F2 732, and the F3 733. The ordering of the filters can be based on an optimized ordering determined by a filter optimizer (FO) that may shuffle the filters to the optimized ordering. In various embodiments, the sink 712 may be able to accept tuples without transforming the tuples by TR3 723 through J3 743.

In various embodiments, the determined ordering for the filters in FIG. 7 may be the optimized ordering, or a test of an order configuration. Before the F3 733 filters the tuples, the tuples may need to be readable by the filter. For the tuple to become readable by F3 733, the tuple may need to be transformed by TR3 723. In various embodiments, the join ordering may require the tuple to be transformed by TR1 721 and TR2 722 before the tuple may be transformed by TR3 723. After the tuple passes through TR1 721, TR2 722, and TR3 723 the filter F3 733 can either filter the tuple from the data stream or let the tuple pass through to the next operator. The next operator J2 742 joins the information to transform the tuples in TR2 722 and the filter together F2 and transforms the tuple back to the configuration of the TR2 722 to be able to be read by the F2 732. The F2 can filter the tuple from the data stream or let the tuple pass to the next operator. The next operator J1 741 joins the information to transform the tuples in TR1 721 and the filter together F1 and transforms the tuple back to the configuration of the TR1 721 to be able to be read by the F1 731. The F1 can filter the tuple from the data stream or let the tuple pass to the next operator. The next operator is a join operator J3 743 joins the information to transform the tuples in TR3 723 to transform the tuple back to the configuration able to be outputted by the sink 712. In various embodiments, the sink 712 may not require the tuple to be transformed by TR3 723 and the tuple could pass through J3 743 without being transformed by TR3 723.

In various embodiments, the transformation may be imperative to the filtering process. If the filter is unable to process the attributes or information of the tuple, the filter may be unable to determine the correct action for the filtering process. For example, if the filter is unable to determine the correct action for the filtering process, the filter may remove a tuple that otherwise would not have been filtered resulting in a false positive. In another example, if the filter is unable to determine the correct action for the filtering process, the filter may keep a tuple that otherwise would have been filtered resulting in a false negative. To ensure that the filter receives the tuples correctly the transformations when applicable can be joined to the filters.

In FIG. 8, a table for determining an optimized filter ordering using filter time to determine a filter shuffle is illustrated. A filter ordering table can be displayed based on the configuration of the data stream. A filter optimizer can be configured to output the filter ordering to be accessed by an administrator of the data streaming environment. The filter ordering can also include information based on optimized filter ordering, or information based on every filter ordering.

The filter ordering table may display a filter order, a time period of each of the filters, a tuples remaining after each of the filters, a tuples remaining after the filtering, and/or a total time used by filtering. Additional information may be added by the data streams administrator such as transformation times, or operations completed by additional operators. The information gathered by the table may be used by the filter optimizer to adjust the ordering of the filters, or by the data streams administrator to adjust the ordering of the filters.

In various embodiments, the filter runtime may be static for some filters. In other embodiments, the filter runtime may be dynamically determined for others. The filter runtimes for example based on the complexity of a tuple, or learned correlations between two filters. For consistency, the runtimes per tuple of the filters can be independent of each other, and statically determined.

For example, a first filter F1 can have a runtime of 10 seconds and a selectivity of 90%, where the selectivity of the F1 retains 90% of the tuples that enter the filter. A second filter F2 can have a runtime of 10 seconds and a selectivity of 30%, where the selectivity of F2 retains 30% of the tuples that enter the filter. A third filter F3 can have a runtime of 1 second and a selectivity of 50%, where the selectivity of F3 retains 50% of the tuples that enter the filter.

In the example F3 is the most efficient filter do to a lower selectivity and the quickest filtering time filter whereas F1 is slow and unselective, and F2 is slow but more selective than F1. Suppose that the cost of each transformation is negligible in this case. An example of filter efficiency can include selectivity or runtime. The runtimes can be displayed on the table based on filtering a group of 1000 tuples. Each of the filter orderings are based on the filter times and the filter tuple retentions above. The 1000 tuples can remain the same through each filter ordering test to ensure consistency. The tuples kept after filtering can remain at 135 tuples due to assuming independence of the filters the filtering time can change.

In various embodiments, if the amount of tuples remaining did not remain constant learned correlations may be present. If the remaining tuples after filtering are different from a previous orientation a learned correlation between filters may be present. The learned correlation may result in an increase in filtering speed or a decrease in tuples retained. By testing each of the filter configurations, the best configuration can be determined of the filter ordering.

The table can determine an optimal filter ordering. The final column total time used by filtering results in a process time for each of the filter configurations. The optimal filter ordering Input→F3→F2→F1→Output results in a runtime 7500 seconds (sec). This ordering of the filters can improve the processing time of the filters by over two times compared to an initial ordering Input→F1→F2→F3→Output with a process time of 19270 sec.

Figure 9:
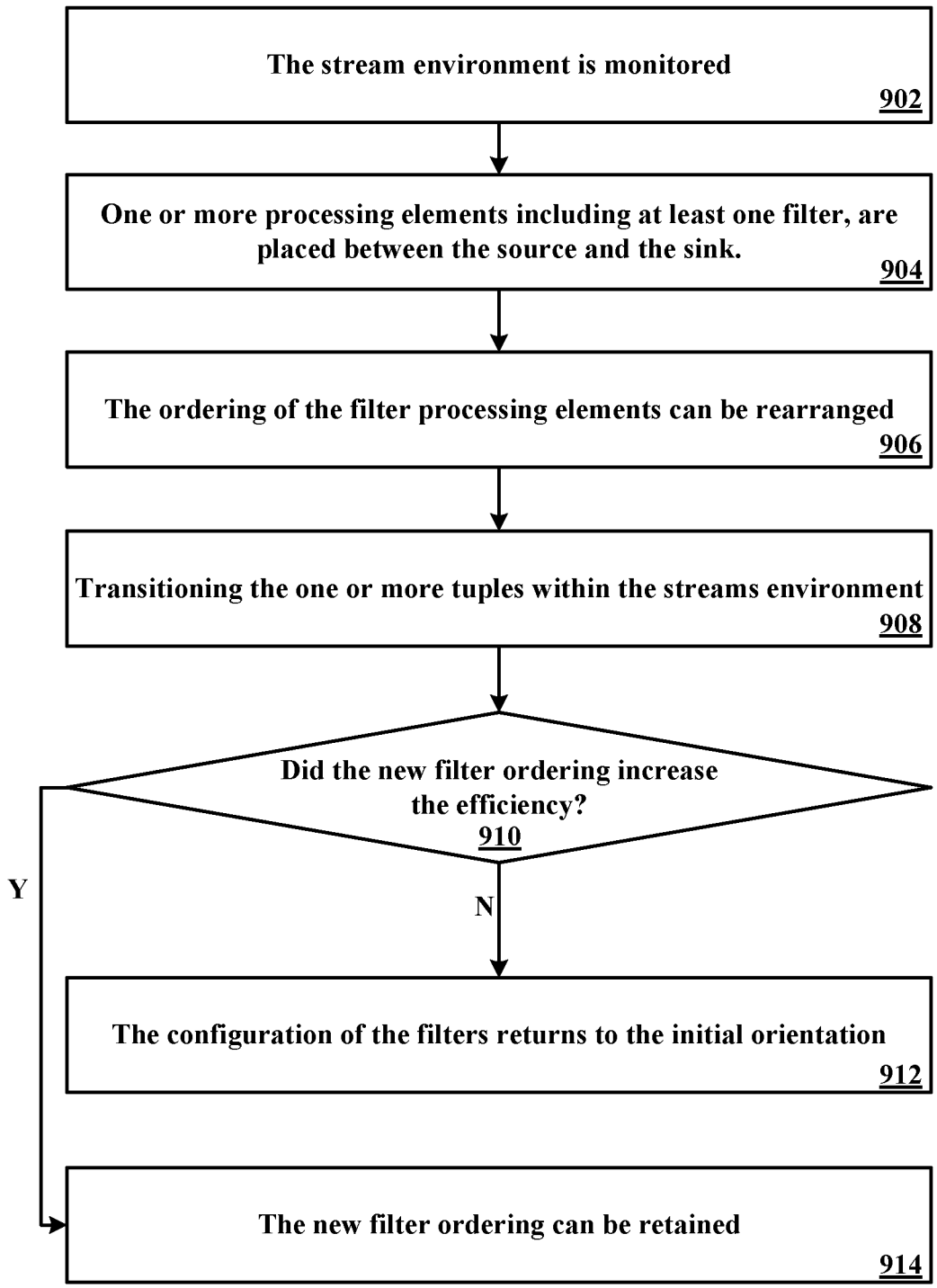
FIG. 9 illustrates a flow chart to determining an efficient filter shuffle, according to various embodiments.

In FIG. 9, a flow chart for determining an efficient filter shuffle is illustrated. In operation 902, the stream environment is monitored as tuples pass from a source to a sink. The tuples flow through operators that can perform actions upon the tuples based on the configuration of the operator.

In operation 904, between the source and the sink one or more processing elements are positioned. The one or more processing elements can include filters that are placed between the source and the sink. The filters are configured to remove certain tuples as they move through the filter. The determination of the filtering can be due to attributes of the tuple and criteria of the filter.

In various embodiments, the processing elements can also include transformation operators. The transformation operators can transform the attributes of the tuples to be readable by the filter or filters assigned to the transformation. The transformation operators can also be joined to filter processing elements to ensure that the transformation of the attributes happen before the tuple is filtered.

In operation 906, the ordering of the filter processing elements can be rearranged. The filter shuffle can include repositioning the processing elements of the stream environment. For example, the processing elements may begin by being ordered in a first filter ordering. The rearrangement can result in a second filter ordering different from the first filter ordering. When rearranging the filter ordering the tuples may have to be managed to ensure that tuples are not lost or improperly processed. To prevent the tuples from being improperly processed transitions may be placed on the tuples to manage the tuples.

In operation 908, one or more tuples within the streams environment are transitioned to ensure that the one or more tuples are not lost within the filtering processes. The transition may include managing the flow of the one or more tuples to ensure tuples that have been filtered are removed from the one or more tuples, and that tuples that have not yet been filtered are processed by each filter. To ensure that the tuples are not lost, the transition may manage the tuples by rerouting the tuples to the beginning of the filter grouping. The filter grouping may include the filters that are to be rearranged in to a new filter ordering in operation 906.

In various embodiments, the transition can include managing the tuples by rerouting the tuples within the filters to the beginning of the filters. The transition can order the filters and reroute the tuples within a filter grouping to the beginning of the filter grouping. For example, the tuples currently within a first filter ordering may be sent back to the source before reordering the filters. After sending the tuples to the source, the second filter order can be created. After the second filter ordering is created, the tuple flow can be started at the beginning of the second filter ordering.

In various embodiments, the transition can include managing the tuples by pausing the tuple flow. The transition can pause the tuple flow from entering the filter grouping, finish filtering the tuples within the filter ordering, and create the new filter ordering after the original filter ordering has been emptied of in process tuples. For example, a first filter ordering may be reordered to a second filter ordering. Before reordering, a pause may be placed upon the tuples entering the first filter ordering. The tuples that are within the first filter ordering can be processed and sent to the sink. The first filter ordering has been emptied of in process tuples, and the second filter ordering can be created. The second filter ordering can then remove the pause placed upon the tuple flow, which can resume the tuple flow and cause the tuples to enter the second filter ordering.

In operation 910, the new filter ordering is tested to determine if the new filter ordering is more efficient than the current filter ordering. When determining if the filter ordering is more efficient, the efficiency can be calculated with speed and/or tuples kept after filtering. An example of speed can include the total time used by the new filter ordering. The tuples kept after filtering can include how many tuples remain after the new filtering operation. If the efficiency of the new filter ordering is greater than the efficiency of the current filter ordering, the flow chart can progress to operation 914. If the efficiency of the new filter ordering is less than the efficiency of the current filter ordering, the flow chart can progress to operation 912.

In various embodiments, a first condition or a second condition can be generated based on the determination of the filtering efficiency of the new filter ordering. For example, if the new filter ordering is more efficient than the current filter ordering a first condition can be generated. In response to the first condition, the filters may be shuffled to the new filter orientation. The result of the first condition can be recorded by the filter optimizer. In another example, if the filter ordering is less efficient than the current filter ordering a second condition can be generated. The second condition can include keeping the filter ordering the same as the current filter ordering and the filter optimizer can record the filter ordering that resulted in the second condition.

Depending on the configuration of the streams environment, if the tuples kept after filtering of the new filtering operation is greater than the current filtering operation, the flow chart can progress to operation 914. If the tuples kept after filtering of the new filtering operation is less than the current filtering operation, the flow chart can progress to operation 912.

In operation 912, the efficiency of the new filter ordering may be less than the efficiency of the current filter ordering. The configuration of the ordering of the filters can return to the initial ordering of the filters. For example, if a new second filter ordering that the filter processing elements were rearranged and is less efficient, the filter ordering can be returned to the first filter ordering.

In operation 914, the efficiency of the new filter ordering is greater than the efficiency of the current filter ordering. The new filter ordering can be retained. For example, if a new second filter ordering has a greater efficiency than a first initial filter ordering, the filter ordering can remain in the new second filter ordering.

In various embodiments, the filter ordering may reorder if the filtering time from the tested new order of filters are less than the current filtering time. If the new order of filters removes more tuples than the current ordering of filters the filters, the ordering of the filter may still be returned to the initial ordering. For example, the filter efficiency may depend on the reduction of time for filtering, not reducing the amount of tuples retained after filtering. The new second ordering of the filters may remove more tuples from the data stream, but take longer to process than the first initial ordering. Even though the tuples removed is more efficient, the ordering of the filters may still be returned to the first initial ordering.

In various embodiments, the filter ordering may reorder if the tuples removed from the tested new order of filters are less than the current remaining tuples. If the new order of filters processes tuples faster than the current ordering of filters the filters, the ordering of the filter may still be returned to the initial ordering. For example, the filter efficiency may depend on the amount of tuples retained after filtering, not the reduction of time for filtering. The new second ordering of the filters may decrease the time to filter the tuples from the data stream, but remove less tuples than the first initial ordering. Even though the time to filter the tuples is efficient, the ordering of the filters may still be returned to the first initial ordering.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for rearranging a set of filters within a data streams environment comprising:
   monitoring a first set of tuples passing through two or more filter processing elements arranged in a first filter ordering to determine a first amount of tuples retained after filtering of the first filter ordering;
   determining a first filter efficiency of the first filter ordering based on the first amount of tuples retained after filtering of the first filter ordering;
   reordering the two or more filter processing elements to create a second filter ordering different from the first filter ordering;
   monitoring a second set of tuples passing through the two or more filter processing elements arranged in the second filter ordering to determine a second amount of tuples retained after filtering of the second filter ordering;
   determining a second filter efficiency of the second filter ordering based on the second amount of tuples retained after filtering of the second filter ordering;
   reverting to the first filter ordering of the two or more filter processing elements in response to determining that the first filter efficiency is more efficient than the second filter efficiency; and
   selecting the second filter ordering in response to determining that the second filter efficiency is more efficient than the first filter efficiency.

2. The method of claim 1, further comprising:
   monitoring a first amount of time used by the first filter ordering to filter the first set of tuples; and
   monitoring a second amount of time used by the second filter ordering to filter the second set of tuples;
   wherein determining the first filter efficiency further comprises determining the first filter efficiency based on the first amount of time; and
   wherein determining the second filter efficiency further comprises determining the second filter efficiency based on the second amount of time.

3. The method of claim 1, wherein the first set of tuples is the same as the second set of tuples.

4. The method of claim 1, wherein a first filter and a second filter of the two more filter processing elements have a correlation with each other.

5. The method of claim 1, wherein reordering the two or more filter processing elements further comprises:
   rerouting a tuple flow within the first filter ordering to a beginning of the first filter ordering;
   creating the second filter ordering; and
   starting the tuple flow at a beginning of the second filter ordering.

6. The method of claim 1, wherein reordering the two or more filter processing elements further comprises:
   placing a pause on a tuple flow entering the first filter ordering;
   processing the tuple flow within the first filter ordering;
   creating the second filter ordering;
   removing the pause that was placed upon the tuple flow; and
   resuming the tuple flow with the second filter ordering.

7. A system for managing a data streams environment, comprising:
   a memory; and
   a processor device communicatively coupled to the memory, the processor device configured to execute instructions stored on the memory to:
   monitor a first set of tuples passing through two or more filter processing elements arranged in a first filter ordering to determine a first amount of time used by the first filter ordering to filter the first set of tuples;
   determine a first filter efficiency of the first filter ordering based on the first amount of time used by the first filter ordering to filter the first set of tuples;
   reorder the two or more filter processing elements to create a second filter ordering different from the first filter ordering;
   monitor a second set of tuples passing through the two or more filter processing elements arranged in the second filter ordering to determine a second amount of time used by the second filter ordering to filter the second set of tuples;
   determine a second filter efficiency of the second filter ordering based on the second amount of time used by the second filter ordering to filter the second set of tuples;
   revert to the first filter ordering of the two or more filter processing elements in response to determining that the first filter efficiency is more efficient than the second filter efficiency; and
   select the second filter ordering in response to determining that the second filter efficiency is more efficient than the first filter efficiency.

8. The system of claim 7, wherein the processor device is further configured to:
   monitor a first amount of tuples retained after filtering of the first filter ordering;
   monitor a second amount of tuples retained after filtering of the second filter ordering;
   determine the first filter efficiency based on the first amount of time and on the first amount of tuples retained; and
   determine the second filter efficiency based on the second amount of time and on the second amount of tuples retained.

9. The system of claim 7, wherein the first set of tuples is the same as the second set of tuples.

10. The system of claim 7, wherein a first filter and a second filter of the two more filter processing elements have a correlation with each other.

11. The system of claim 7, wherein the processor device is configured to reorder the two or more filter processing elements by:
   rerouting a tuple flow within the first filter ordering to a beginning of the first filter ordering;
   creating the second filter ordering; and
   starting the tuple flow at a beginning of the second filter ordering.

12. The system of claim 7, wherein the processor device is configured to reorder the two or more filter processing elements by:
   placing a pause on a tuple flow entering the first filter ordering;
   processing the tuple flow within the first filter ordering;
   creating the second filter ordering;

removing the pause that was placed upon the tuple flow; and resuming the tuple flow with the second filter ordering.

13. A computer program product comprising a computer readable storage medium having a computer readable program stored therein, wherein the computer readable program, when executed by a processor, causes the processor to:

monitor a first set of tuples passing through two or more filter processing elements arranged in a first filter ordering to determine a first amount of time used by the first filter ordering to filter the first set of tuples;

determine a first filter efficiency of the first filter ordering based on the first amount of time used by the first filter ordering to filter the first set of tuples;

reorder the two or more filter processing elements to create a second filter ordering different from the first filter ordering;

monitor a second set of tuples passing through the two or more filter processing elements arranged in the second filter ordering to determine a second amount of time used by the second filter ordering to filter the second set of tuples;

determine a second filter efficiency of the second filter ordering based on the second amount of time used by the second filter ordering to filter the second set of tuples;

revert to the first filter ordering of the two or more filter processing elements in response to determining that the first filter efficiency is more efficient than the second filter efficiency; and select the second filter ordering in response to determining that the second filter efficiency is more efficient than the first filter efficiency.

14. The computer program product of claim 13, wherein the computer readable program is further configured to cause the processor device to:

monitor a first amount of tuples retained after filtering of the first filter ordering;

monitor a second amount of tuples retained after filtering of the second filter ordering;

determine the first filter efficiency based on the first amount of time and on the first amount of tuples retained; and determine the second filter efficiency based on the second amount of time and on the second amount of tuples retained.

15. The computer program product of claim 13, wherein the first set of tuples is the same as the second set of tuples.

16. The computer program product of claim 13, wherein a first filter and a second filter of the two more filter processing elements have a correlation with each other.

17. The computer program product of claim 13, wherein the computer readable program is further configured to cause the processor device to reorder the two or more filter processing elements by:

rerouting a tuple flow within the first filter ordering to a beginning of the first filter ordering;

creating the second filter ordering; and starting the tuple flow at a beginning of the second filter ordering.

18. The computer program product of claim 13, wherein the computer readable program is further configured to cause the processor device to reorder the two or more filter processing elements by:

placing a pause on a tuple flow entering the first filter ordering;

processing the tuple flow within the first filter ordering;

creating the second filter ordering;

removing the pause that was placed upon the tuple flow; and resuming the tuple flow with the second filter ordering.

* * * * *